United States Patent [19]

Beglin et al.

[11] Patent Number: 4,771,375
[45] Date of Patent: Sep. 13, 1988

[54] MANAGING DATA STORAGE DEVICES CONNECTED TO A DIGITAL COMPUTER

[75] Inventors: Thomas W. Beglin; Jane R. Bittihoffer; Harvey E. Kamionka; Jerry W. Pence, all of Tucson, Ariz.

[73] Assignee: International Business Machines Corporation, Armonk, N.Y.

[21] Appl. No.: 907,421

[22] Filed: Sep. 15, 1986

Related U.S. Application Data

[62] Division of Ser. No. 570,054, Jan. 12, 1984, Pat. No. 4,638,424.

[51] Int. Cl.$^4$ ................................................. G06F 3/00
[52] U.S. Cl. ...................................... 364/200; 364/300
[58] Field of Search ... 364/200 MS File, 900 MS File

[56] References Cited

U.S. PATENT DOCUMENTS

| | | | |
|---|---|---|---|
| 4,104,718 | 8/1978 | Poublan et al. | 364/200 |
| 4,310,882 | 1/1982 | Hunter et al. | 364/200 |
| 4,310,883 | 1/1982 | Clifton et al. | 364/200 |
| 4,467,421 | 8/1984 | White | 364/200 |
| 4,528,624 | 7/1985 | Kamionka et al. | 364/200 |
| 4,536,836 | 8/1985 | Dodd et al. | 364/200 |
| 4,536,837 | 8/1985 | Olson et al. | 364/200 |
| 4,633,387 | 12/1986 | Hartung et al. | 364/200 |
| 4,638,424 | 1/1987 | Beglin et al. | 364/200 |
| 4,638,425 | 1/1987 | Hartung | 364/200 |
| 4,638,427 | 1/1987 | Martin | 364/200 |

OTHER PUBLICATIONS

IBM Technical Disclosure Bulletin, Frank et al., vol. 20, #9, Feb. 1978, pp. 3651–3657.
IBM Report TR 00.2842, "Concepts in Auxiliary Storage Management", Boyce, Mar. 10, 1977.

Primary Examiner—Gareth D. Shaw
Assistant Examiner—Viet Q. Nguyen
Attorney, Agent, or Firm—H. F. Somermeyer

[57] ABSTRACT

A storage-management program, executable in one host or simultaneously in a plurality of hosts, manages concurrently executing migration, recall, and recycle (such as defragmentation) tasks. Accesses to data storage volumes (tape, disks, etc.) are managed in accordance with predetermined contention resolution procedures and priorities. Certain tasks are non-interruptible.

8 Claims, 7 Drawing Sheets

MANAGING DATA STORAGE DEVICES CONNECTED TO A DIGITAL COMPUTER

This application is a divisional of application Ser. No. 570,054, filed Jan. 12, 1984, and now U.S. Pat. No. 4,638,424.

DOCUMENTS INCORPORATED BY REFERENCE

1. IBM Publication: GH35-0007-6—"OS/VS2 MVS Hierarchical Storage Manager: General Information", Program Number 5740-XRB, 1980.
2. IBM Publication: SH35-0023-1—"OS/VS2 MVS Hierarchical Storage Manager System Programmer's Reference and Operations Guide", Program Number 5740-XRB, 1978.
3. IBM Publication: SH35-0024-1—"OS/VS2 MVS Hierarchical Storage Manager: User's Guide", 1978.
4. IBM Publication: LY35-0026-1—"OS/VS2 MVS Hierarchical Storage Manager Logic", Program Number 5740-XRB, 1978.

The above-identified publications are available from International Business Machines Corporation, Armonk, N.Y.

FIELD OF THE INVENTION

The present invention relates to machine-implemented management of data storage space in a data processing environment.

BACKGROUND OF THE INVENTION AND DISCUSSION OF THE PRIOR ART

In data processing installations, host processors generally have a relatively large plurality of peripheral data storage devices for storing data to be used in connection with hostprocessor operations. Each host processor generally executes programs that allocate portions of the data storage space of the respective peripheral data storage devices to various computer processes within the host processor. Each computer process is often referred to as a "user" of the peripheral data storage device. Such allocation programs also provide for deallocations and reallocations of the data storage space and often defragments the data stored in the storage spaces by sequences of allocations and deallocations. Storage space fragmentation occurs when data is stored in a manner to leave a number of unused storage spaces—many of which are relatively small. As a result, the host processor has a reduced ability to assign real storage locations for data storage because the available spaces are too small to store the data. Therefore, fragmentation decreases the efficiency of the peripheral data storage space by reducing usable space and increases access time to the stored data. Generally, once the data storage space is allocated for a user or a set of users, so-called access methods, such as VSAM (virtual storage access method), select the allocated areas for storing or retrieving data.

When the data processing environment grows to have an extremely large number of addressable data storage volumes which are mountable on a data storage unit, such as a magnetic tape recorder or disk recorder, the utilization of such data storage space and the accessing of such data storage space become extremely complicated. As a result, various programs have been devised for enhancing utilization of peripheral data storage space and for providing automatic management of such peripheral data storage space. Included in such programming is a goal of balancing the data storage and retrieval operations among a large plurality of such data storage devices. Such balancing enables the access methods to operate more efficiently, thereby providing a higher-performance data processing environment.

For balancing peripheral device activity while still affording a high degree of data-storage-space utilization in the various devices, the Auxiliary Storage Manager program, supplied by International Business Machines Corporation, keeps a history of the time it takes to service one page unit of data being transferred in a paging and swapping environment. Such history is kept for each page of data storage space in main memory of a host processor. Time of day is saved immediately prior to calling an input/output supervisory program and again on the entry of the data into the main memory. The two time values are subtracted and then divided by the number of page-request (data is handled in "pages") services to obtain the time to service one page request for a plurality of such page requests. This calculated time-delay value is factored into a previously calculated average time for the page being handled. The algorithm for calculating service time is one-half of the old service time plus one-fourth of the newly calculated service time plus one-fourth of expected service time. In this manner, the calculated service time reflects the historical service rate for a one-page request over several time periods, as well as the expected service rate for an upcoming time period. Using these calculations, if a peripheral data storage device is slow or very busy, fewer data storage requests are initiated to that device; in contradistinction, a fast-responding device will have more page requests initiated to it for achieving a load balancing based upon page access delays.

Typically, in a paging-and-swapping environment, there are a relatively small number of peripheral data storage devices; accordingly, the techniques of the Auxiliary Storage Manager provide adequate management of the access times and data storage requests. However, when a larger number of peripheral data storage devices are servicing a larger number of host processors, such an approach to load balancing and management of access time may not provide optimum or desired results. Accordingly, different types of management techniques may have to be employed in a large peripheral data storage environment which includes paging and swapping as well as other data storage operations.

A swap storage management is described in the IBM Technical Disclosure Bulletin Volume 20, No. 9, February 1978, pages 3651 through 3657. This technique controls the flow of tasks between peripheral disk data storage and main data storage of a host processor. The described data storage management does not accommodate a large variety of data storage devices, as commonly found in many data processing environments; therefore, the storage management techniques of this article are not generally applicable to managing all of the data storage devices in a complex data processing environment.

Other techniques include allocating data storage space based upon the total free space available in the various peripheral data storage devices. While such a technique provides for efficient allocation control, such technique does not address the problems of data promotion (recall), defragmentation, and the like. Accordingly, it is desired that some form of data storage management be provided, not only for handling data demotions (migrations), etc., but also for handling data promotion (recall) and defragmentation suitable for a plurality of host processors having a larger plurality of diverse peripheral data storage devices. The term "migration" means a data transfer from a rapid-access peripheral data storage device to a slower-access peripheral data storage device, while a "recall" is a data transfer in the opposite direction.

Some progress has been made in the handling of multihost-managed peripheral data storage devices for migration, recall, backup, and recovery. International Business Machines Corporation of Armonk, New York, has provided a program product called "Hierarchical Storage Manager", Program No. 5740-XRB, as described in the Documents Incorporated by Reference. This program product can operate in one or simultaneously in a plurality of host processors for providing so-called "global" management of a large plurality of peripheral data storage devices of diverse types. For example, the Hierarchical Storage Manager (HSM), supplied by International Business Machines Corporation, manages data storage spaces in a variety of direct-access storage devices, a mass storage system identified as the IBM 3850 Mass Storage System, and magnetic-tape data recorders. This program product provides space management, backup, and recovery functions for managing data sets in a logical hierarchy of the above-mentioned data storage devices. The program is a continuously running task on all of the host processors.

Under HSM, various logical levels of peripheral data storage space are provided. A set of data storage devices called primary storage space is that data storage space where the various application programs executing in host processors access the needed data. The HSM program optimizes the use of the primary data storage space by automatic migrations of data to lower cost data storage devices (data demotion or migration), and automatically moves data needed by the host processors from the migration data storage space back to the primary data storage space. Also, aged data sets can be deleted and retired. Various attributes and parameters determine how HSM provides migration, recall, backup, recovery, and deletion of data sets with respect to the diversity of data storage devices.

In HSM, several central data sets are employed by the various host processors for serializing management of the various peripheral data storage devices and for coordinating operations of the host processors with respect to the various peripheral data storage devices. A plurality of so-called user exits in the HSM program facilitate operator parameter input to the program for more efficiently managing its functions.

HSM also receives commands from an operator's console which are interpreted by HSM to perform explicitly requested functions. HSM generally operates independently of operator intervention in that most functions are implicitly performed, including migration and recall—that is, on a recall, if an application program requests a data set from a primary volume and it was migrated by HSM to another data storage device, HSM intercepts the request for a migrated data set and promotes, or recalls, such requested data set from the migration volume storing the data set to a primary volume. The the application program can continue to run even though there is a delay caused by the recall function.

One of the operator commands is ADDVOL which enables the operator to add volume of data to be managed by HSM, change the attributes of managed volumes and the like. The documents incorporated by reference describe ADDVOL including the assignment of data storage volumes as primary data storage, migration data storage and the like. HSM enables the HSM-executing host processor to maintain lists of data storage volumes for establishing a logical data storage hierarchy wherein the primary data storage volumes are the upper, or data-accessing, level of the hierarchy, while the migration volumes constitute the various lower, or internal, levels of the logically established data storage hierarchy.

Even with all of the interactive and automatic functions provided by HSM, a more-complete management of peripheral data storage space with more-efficient space utilization and reduced access time is still desired.

Historically tape data storage volumes (reels of tape) were limited to a single user, i.e., effectively a single set of data sets. It is desired that such tape data storage volumes be more efficiently utilized by permitting sharing of such data storage volumes among several host processor processes. Accordingly, it is desired to provide automatic means for facilitating sharing of various data storage volumes within a data processing environment.

The term "data storage volume" is intended to mean an addressable unit of storage which is often physically characterized by a single reel of tape, a single diskette or removable set of data storage disks, a single spindle of disks, or merely a logically-defined data storage space which may be more or less than the data storage capacity of any physical data storage unit associated with the logically-defined data storage space. For example, a logical data storage volume can represent a data storage capacity of 100 megabytes, one million megabytes, etc.

Managing a large diversity of peripheral data storage devices on a shared-volume basis results, as indicated by the theory of probability, in a relatively large number of access contentions by the various host-processor processes and tasks being performed. Accordingly, it is desired to have a facile contention-resolution mechanism which enables good utilization of data storage space, good management of access requests, and a relatively simple mechanism for coordinating the contention resolutions of the various peripheral data storage volumes by one or more independently-operating host processors.

SUMMARY OF THE INVENTION

The invention relates to the automatic machine-implemented management of data storage space which is automatically accessible by a digital computer; such automatic access may require machine-commanded manual mounting replaceable data storage media prior to the automatic accessing.

In accordance with the invention, data storage space is managed automatically by: data demotion or migration from primary data storage volumes to secondary or migration data storage volumes; data promotion or recall from such secondary or migration data storage volumes; and defragmention of data storage space of the data storage volumes, also termed recycling. The primary data storage volumes are those volumes normally accessed by a data processor or host processor in carrying out programs of instructions requiring data stored in any of the primary or secondary data storage volumes.

Data-storage-volume usage by multiple users is facilitated for increasing data-storage-volume utilization. Such data storage volume sharing is enhanced by the present invention by employing priorities for data transfers occurring during data demotion, data promotion, and defragmentation. Certain data transfers into one data storage volume for a first purpose are switched in the middle of the transfer to another data storage volume for enabling the data-receiving volume to be employed in an unrelated data transfer. For example, migration of data into a first data storage volume is switched to another volume whenever such first volume is needed for supplying data signals related to a data promotion. Even though current defragmenting data transfers are not interruptible by data promotions or demotions, such defragmenting is not initiated during a current data promotion or demotion. Diverse priority controls among the three functions of data promotion, data demotion, and defragmentation facilitate data-storage-space utilization while maintaining performance of the using host processors.

The invention is particularly useful with removable data storage media, such as magnetic data storage tapes mountable on a data recorder, either manually or automatically, with removable magnetic data storage disks of either the rigid or flexible type, or with so-called optical disks of write-once, read-mostly, or rewritable types. The invention is also applicable to so-called fixed media, such as rigid data storage disks of all types, or to a combination of fixed and removable media. Random-access data storage units and cached data storage units may also be employed. Addressable units of the data storage media are termed "volumes".

The invention is usable in a multihost data processing environment wherein the data-storage-volume-managing program of instructions is executed simultaneously and independently on any one or more of the host processors in the multihost environment. A common data set is shared by the host processors for coordination of the management functions performed and for effecting the priorities and dynamic logical reconfigurations employed by practicing the present invention.

The foregoing and other objects, features, and advantages of the invention will be apparent from the following more-particular description of preferred embodiments of the invention, as illustrated in the accompanying drawings.

DETAILED DESCRIPTION

Figure 1:
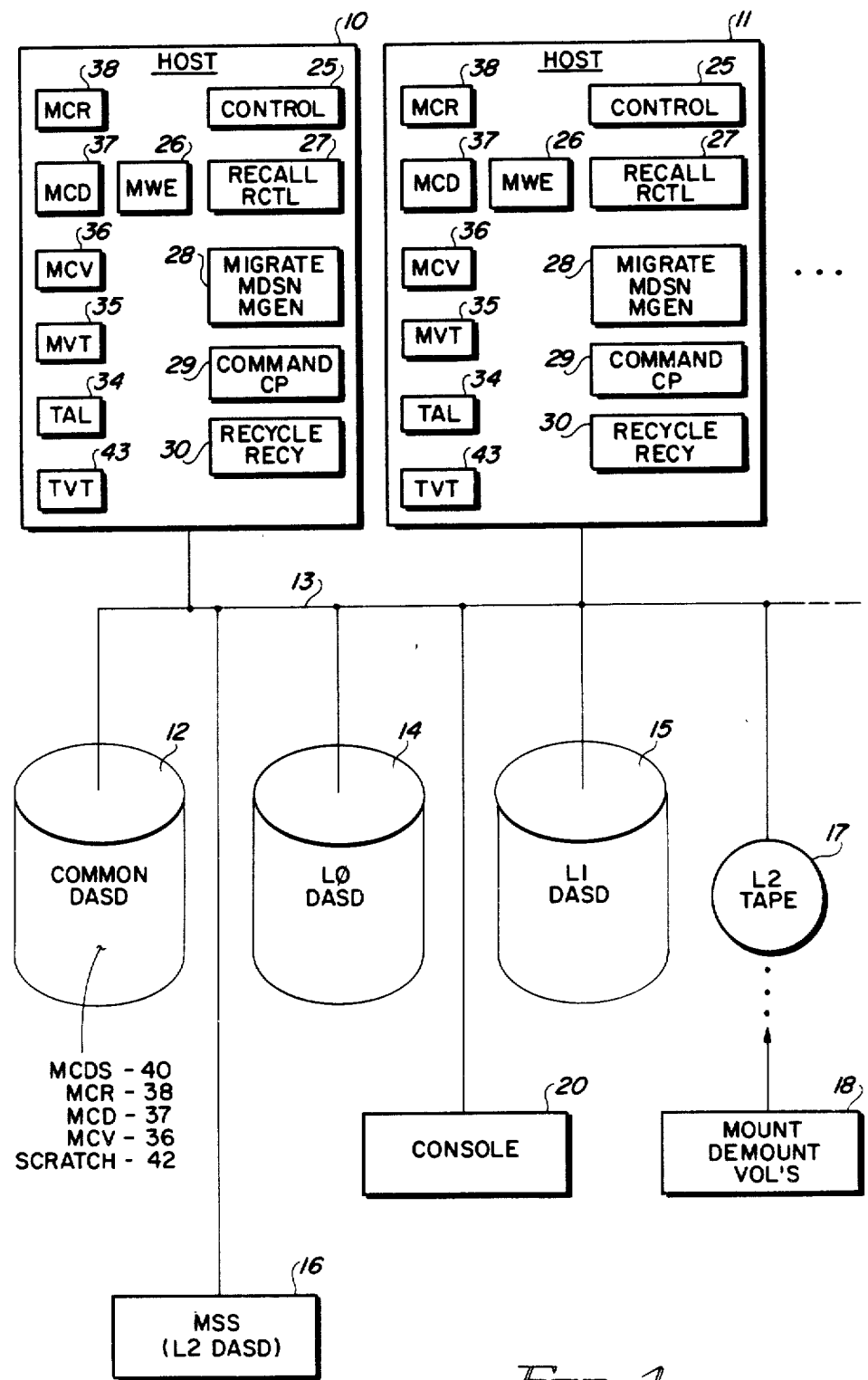
FIG. 1 is a simplified, combined, logical-hardware illustration of a multihost data processing system having a plurality of peripheral data storage devices which are automatically managed by a single program simultaneously running in a plurality of the host processors connected to the peripheral data storage devices.

Referring now more particularly to the appended drawings, like numerals indicate like parts and structural features in the various diagrams. The invention is described as being practiced in a multihost-processor data processing environment having a relatively large number of peripheral data storage devices of diverse types and capabilities. It is to be understood that the invention may be practiced with equal facility in a single host processor environment having a smaller number of peripheral data storage devices. The description of the invention is also based in part upon the documents incorporated by reference, which documents describe an existing program which provides many recall, migration, and other data-storage-management functions which are advantageously employed when practicing the present invention.

A simplified multihost environment has two host processors (hosts), 10 and 11, each of which includes the usual component portions of a host processor, such as the calculator portion, main memory, peripheral or input/output channels, and each of which can be either a unit processor or a multiprocessor. Such hosts employ various operating systems not pertinent to an understanding of the present invention.

Within each host illustration is a set of boxes representing various portions of a computer program employing the invention, as will be detailed. Hosts 10 and 11 are coupled via input/output, or peripheral, connection 13 to common DASD 12. Common DASD (direct-access storage device) 12 consists of a high-performance disk-type data storage device. Stored in common DASD 12 are those control data structures desired for coordinating operations of hosts 10 and 11 in executing the data-storage-managing program. These data structures will be detailed later. A set of primary DASD volumes 14, also labeled L0 DASD, stores those data sets directly accessed by the hosts 10, 11 and receives data sets for storage generated by hosts 10, 11. Such L0 DASD 14 consists of a plurality of high-performance, or rapid-access DASDs.

The data processing environment also employs lower performance DASDs 15, labeled L1 DASD. When the data sets stored in L0 DASD 14 become aged through nonaccess by the hosts 10, 11, the data-storage-manager program automatically moves data sets from L0 DASD 14 to L1 DASD 15 such that data-set access by the hosts 10 and 11 is enhanced by keeping only those data sets that are frequently accessed in L0 DASD 14. DASDs 14 and 15 represent the first two levels of the logical data storage hierarchy created by the data-storage-management program.

Also attached to hosts 10 and 11 via input/output connection 13 is mass storage system MSS 16. MSS 16 appears as a L2 DASD for storing those data sets having a greater period of inactivity than those data sets stored in L1 DASD 15. Also, a set of data tape recorders, represented by number 17, is employed for archival or other long-term L2 data storage, backup, and the like. MSS 16 and DASDs 12, 14 and 15 provide for automatic accessing of all data sets stored therein, while tape recorders 17 usually require operator intervention for mounting tape volumes (reels). To this end a console 20 is coupled to the host processors 10 and 11 via input/output connection 13. Console 20 provides a START capability for initiating the continuously-running task of the storage-management program on all of the host processors 10, 11 utilizing the peripheral data storage devices 12, 14, 15, 16 and 17. Also, console 20 receives tape mount messages from any of the host processors 10 and 11. The operator (not shown) reads the mount message at the console. The operator then obtains the appropriate reel of tape (data storage volume) and mounts that reel of tape on the designated data tape recorder 17 all as indicated by the function box 18. Similarly, hosts 10, 11 issue demount messages to console 20. An operator (not shown) responds to the demount message displayed at console 20 to remove a mounted reel of tape from a data tape recorder 17 and put it in an appropriate reel storage area (not shown).

The various data storage devices can be accessed by less than all of the connected hosts 10, 11. Accordingly, if a data set in on a reel of tape (not shown) currently being accessed by host 10; then if host 11, not connected to the tape recorder currently mounting the reel of tape, needs a data set stored on such reel of tape, a demount message is given to console 20 for demounting the tape from the first tape recorder 17; then a mount message indicates to the operator that that same demounted reel of tape should be mounted on a second tape recorder 17 accessible by host 11. Similarly, not all of the DASDs 14, 15 may be accessible by the hosts 10 and 11. A relatively large number will be accessible by all of the hosts, enabling data sets to be transferred among the various peripheral data storage devices such that any host 10, 11 can access any data set controlled by the described storage-management program.

The continuously-running storage-management program includes instructions residing in all of the hosts 10, 11. A first program module control 25 contains the control portions of the program. These control portions include a dispatcher for dispatching the later-described tasks for performing the functions requested through console 20 and functions initiated automatically by the continuously-running task based upon analyses of operating parameters in the multihost environment. Such parameters and automatic invocation of various tasks are described in the documents incorporated by reference. In the storage-management program, the various command- and parameter-induced functions are transmitted to the various tasks through so-called management work elements (MWE) 26. MWEs 26 are described in the documents incorporated by reference. Each MWE 26 includes identification of a function to be performed, along with sufficient parameter and control information to enable the various tasks to perform the identified function. An important function in the storage-management program is recall function 27, also abbreviated RCTL. Recall occurs either implicitly or explicitly. An implicit recall results from an application program (not shown) requesting a data set which is not currently resident in L0 DASD 14. The recall module 27 enables a host processor to automatically transfer the needed data set to L0 DASD 14 without human intervention. Migrate module 28 can migrate either a data set (MDSN module) or a volume of data (MGEN module) from L0 DASD 14 to any of the other migration volumes represented by L1 DASD 15, MSS 16, and tape recorders 17. One of the user exits can be used to prevent the migrate module 28 from migrating an identified data set; this control pins or tacks the data set to L0 DASD 14. Such an exit may also be used to initiate migration or give priority for migration to identified data sets.

When parameter data within the data processing environment indicates migration of data sets or volumes from L0 DASD 14, MGEN module is employed. Command module 29, also labeled CP, is a command processor which interprets the commands received from console 20 and generates MWEs 26 for execution by the other modules of the storage-management program. Recycle module 30, also labeled RECY, transfers data between two volumes of peripheral data storage for the purpose of defragmenting the data stored in one of the volumes; in an early embodiment recycle module 30 only defragmented tape volumes. For example, a single L2 tape volume can store data in a highly-fragmented manner. The recycle module 30 can transfer such fragmented data to another L2 tape volume for defragmentation. Such transferring of data from the fragmented tape volume to a scratch, or new, tape volume places all of the data in close proximity, thereby defragmenting the storage of data. In a similar manner, MSS 16, through its volumes of data storage, could use recycle for defragmentation.

The data structures employed by the just-described modules of the storage-management program include a migration-control data set 40, also termed MCDS. MCDS 40 is stored in common DASD 12, with partial copies of the data set being stored in the various hosts for access by the modules in that host. MCV 36 portion of MCDS 40 has records relating to control of a migration volume. In a similar manner, the MCD records 37 have entries storing that data usable for migration control of a data set. MCR records 38 are migration-control records having a plurality of entries associable with the respective hosts 10, 11, etc. Additionally, a mounted-volume table 35 is employed in each of the hosts. Mounted-volume table 35 indicates which tape volumes are currently mounted on the data tape recorders 17 connected to the hosts 10 and 11, as well as any removable DASD data storage packs mounted on the various DASDs. It also can indicate which volumes of MSS 16 are currently mounted in the data recording devices of the MSS. TAL 34 is a tape-allocation list identifying the tape volumes currently allocated by the migrate tasks MGEN and MDSN. These allocations are identified in this description as DDNAME. The common DASD 12 also stores a scratch list 42 of tape volumes having no data stored thereon. TVT 43 is a tape-volume list of all the tape volumes that can still store additional data and are in the library of tape volumes.

Figure 2:
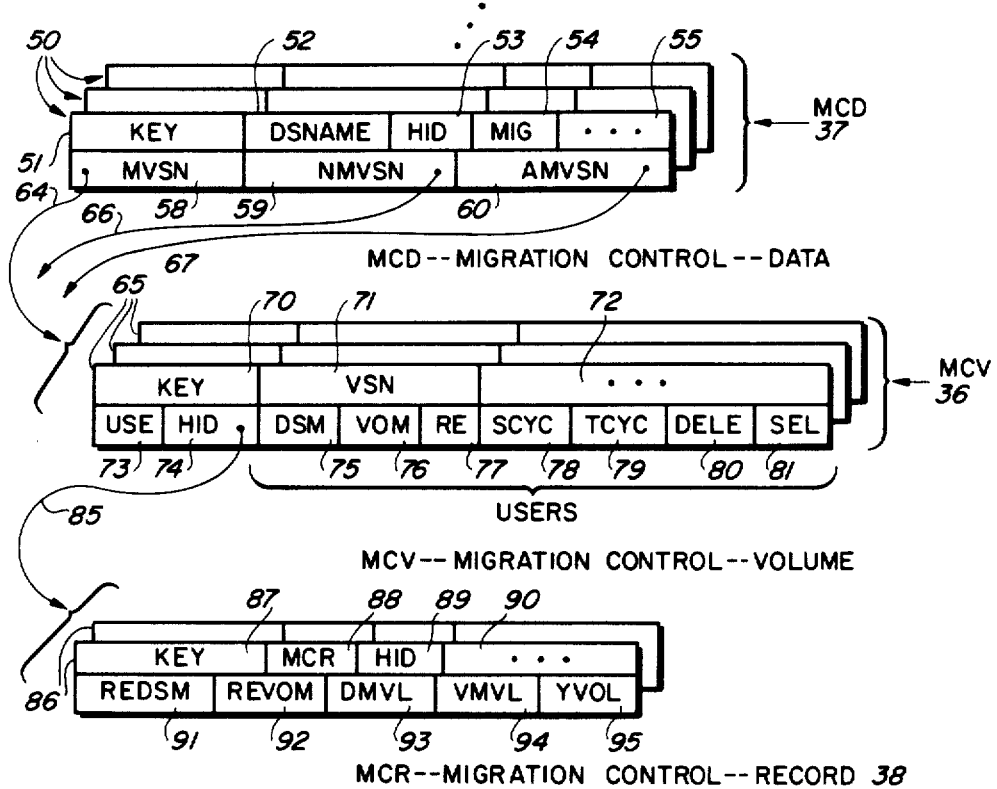
FIG. 2 illustrates key records of a common data set for the host processors of the FIG. 1 illustration for coordination of the simultaneous execution of a computer program in the host processors for the purposes of managing a diversity of peripheral data storage devices.

The MCDS 40 is a key element for practicing the present invention in the FIG. 1 illustrated environment. FIG. 2 illustrates those portions of MCDS 40 necessary for an understanding of the present invention. The description of FIG. 2 is for a single-host environment, it being understood that, in a multihost environment, a larger number of entries in the various records are employed and stored in common DASD 12. In accessing MCDS 40, one MCD 37 record entry is usually first accessed. The MCD 37 record is shqwn as being stored in a plurality of addressable register sets 50. Each register set 50 consists of a plurality of bytes, the number of which is determined by the information stored in a particular record entry—that is, each numeral 50 also represents one entry in MCD 37 record. Such record entries are stored in the main memory (not shown) of both the hosts 10 and 11, as the use requires, and in common DASD 12. Each record entry 50 includes a key 51 identifying the record entry as being a part of the MCD 37 record. DSNAME 52 identifies the data set represented by the particular record entry. HID 53 identifies which of hosts 10, 11 is currently accessing the represented data set. MIG 54 indicates whether the data set has been in fact migrated from the primary data storage L0 DASD 14. Numeral 55 indicates an ellipsis which represents additional fields of the record entry which includes a doubly-linked list for linking all entries of the MCD 37. Of significance to the present invention are fields 58, 59, and 60, which contain the migration volume serial numbers (VSN) of the migration volumes storing the represented migrated data set. MVSN (migration VSN) 58 stores the volume serial number of a first volume storing at least a first portion of the data set identified by DSNAME 52. In accordance with the invention, the data set may be fragmented among a plurality of data storage volumes. NMVSN 59 indicates the number of migration volumes storing a second portion of the data set represented by the record entry in the migration volumes identified. AMVSN (additional migration VSN) 60 contains the identification of all additional migration volume serial numbers, VSN, storing the additional parts of the identified data set. The sequentiality of the data set storage is represented by the sequence of the VSNs in fields 58 and 60.

Each of the volume-serial-number fields in the respective data entries of MCD 37 identifies, as indicated by arrows 66-67, a record entry of MCV 36; that is, each migration volume has a separate entry in MCV 36, the collection of such record entries being denominated by numeral 65. Each of these record entries stored in common DASD 12 or the main memories (not shown) of the hosts 10 and 11 includes a key 70 which identifies the record entry as a part of MCV 36. VSN 71 identifies the volume serial number (VOLSER) of the data storage volume represented by the record entry. Ellipsis 72 indicates additional data fields not pertinent to an understanding of the present invention. USE bit 73 indicates whether the identified migration data storage volume is currently being used by one of the hosts 10, 11, etc. HID 74 indicates which host is currently using the identified data storage volume. As used for FIG. 2, the term "users" refers to the various tasks of the storage-management program using the identified data storage volume; for example, bit DSM 75 indicates that the migration task MDSN is currently accessing, or using, the represented data storage volume. Bit VOM 76 indicates that the migration module MGEN is currently accessing the represented volume. RE bit 77 indicates whether the recall task is currently accessing the identified volume. SCYC 78 and TCYC 79 represent whether the recycle task is accessing the represented volume as a source volume (the source of the fragmented data) or as a target volume (a scratch volume receiving the data in an unfragmented form), respectively. DELE 80 indicates whether a deletion module, which is a portion of recall, is accessing the represented volume. SEL 81 indicates whether the volume has been selected for access for data transfer operations as that term is used in IBM peripheral data processing operations.

As indicated by arrow 85, the MCR 38 record entries are pointed to by the HID 74 field of MCV 36. Each host has a record entry 86 within MCR 38. MCR 38 is stored in common DASD 12, wherein any host within the data processing environment can access the MCR entry (one entry per host) of any other host for purposes that will become apparent. Each MCR entry 86 includes a key 87 indicating that it is a portion of MCR 38. The letters MCR are included in field 88. HID 89 indicates which host is represented by the MCR entry. Ellipsis 90 represents additional fields within each entry not pertinent to an understanding of the invention, which may include link-listing of the various entries. REDSM 91 indicates that the host indicated by HID 89 currently has a data set migration function being performed by its migration module 28 on a volume needed by a recall function somewhere in the data processing environment. In a similar manner, REVOM 92 indicates that a migration volume used by MGEN is needed by a recall somewhere in the data processing environment. REDSM 91 and REVOM 92 can be single bits which steer the execution of the storage-management program, as later described, for releasing migration volumes needed for recall at a suitable breakpoint, such as at the end of a data set transfer. This action can result in dynamic logical reconfigurations of the data storage volumes, as will become apparent. Fields DMVL 93, VMVL 94, and YVOL 95 store volume serial numbers (VOLSERs) of data storage volumes that are currently selected, respectively, for the data set migrate MDSN task 28A (FIG. 3), the volume migrate task 28B (FIG. 3), and recycle task RECY 30. Each of VOLSERs in fields 93, 94, and 95 point to a MCV 36 entry which further describes the identified data storage volumes, respectively. Since the various other identified tables are constructed using known techniques to store the data identified for such tables, they are not detailed.

Figure 3:
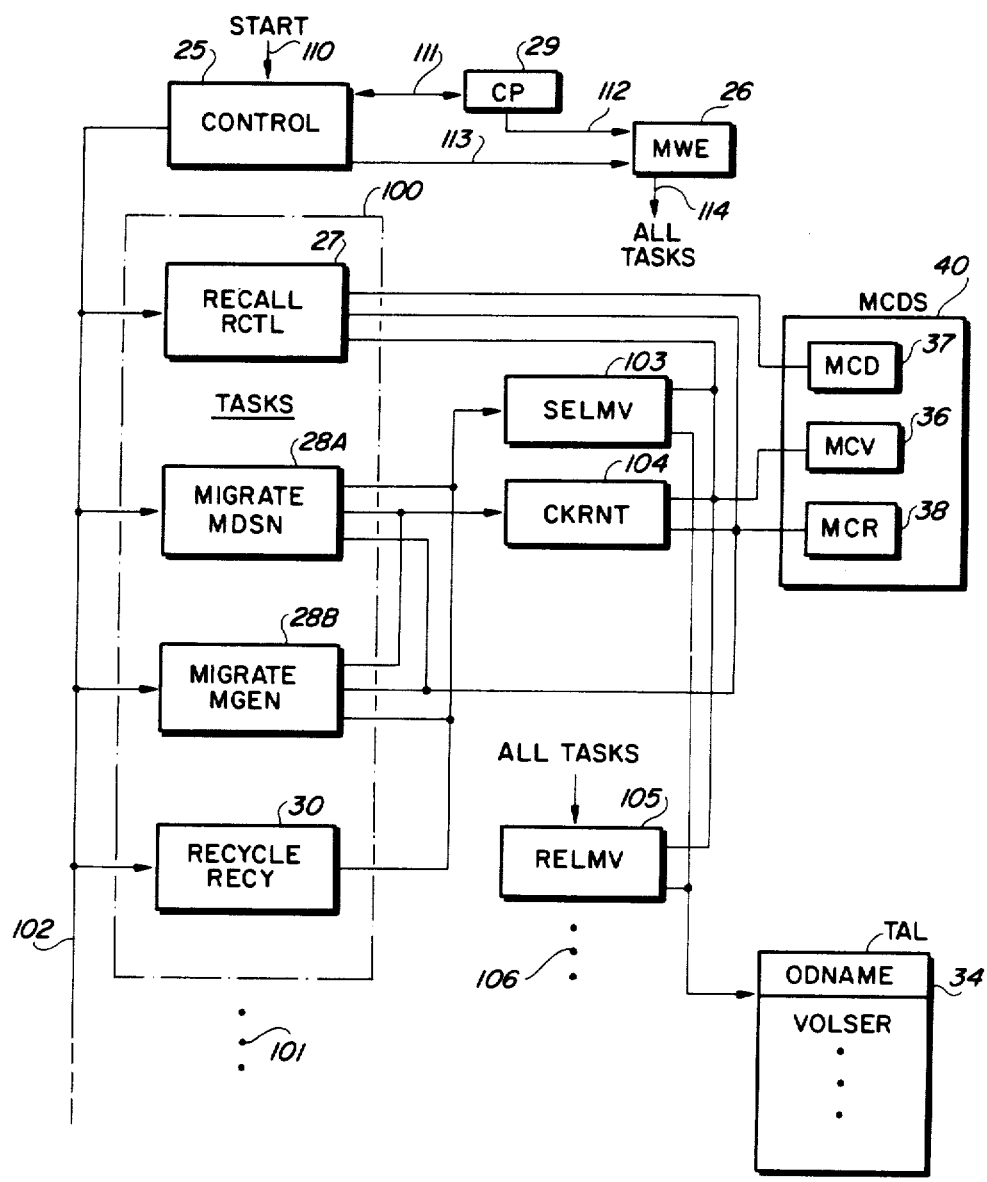
FIG. 3 is a simplified flow diagram illustrating the flow of data-storage-device management of the simultaneously-executed computer program in one or more of the FIG. 1 illustrated host processors.

FIG. 3 shows a general arrangement and flow of the storage-management program for implementing the present invention. START signal 110 received from console 20 is supplied over input/output connection 13 to each of the hosts 10, 11 for starting the continuous running of the control module 25 in all of the hosts which will simultaneously execute the illustrated storage-management program. It is to be understood that appropriate "wake-up" machine-effected procedures (see the documents incorporated by reference) are employed such that the storage-management program can be invoked for operation at any appropriate time. Double-headed arrow 111 represents control module 25 activating CP 29 for interpreting a command supplied to it from console 20. Such commands also could be received through remote teleprocessing lines (not shown). CP 29 interprets the received command for generating a suitable MWE 26. CP 29 also queues the generated MWEs 26 in an appropriate FIFO (first-in, first-out) queue (represented by arrow 114) for scanning by the various tasks for executing the commanded function. In a similar manner, control module 25 activates various modules (not detailed), represented by arrow 113, for generating additional MWEs 26 and adding MWEs to the work queue of the storage-management program. All of the illustrated tasks will scan the MWE 26 queue 114, in looking for work to be done in the storage-management area. Detailed construction of each MWE 26 is shown in the documents incorporated by reference, particularly see LY35-0026-1.

The tasks of interest to the understanding of the present invention are represented collectively by numeral 100, which includes the recall task 27, the migrate tasks 28A (MDSN) and 28B (MGEN), and the recycle task 30. Such tasks are initiated through the control module 25 acting as a dispatcher, as represented by line 102. Additional tasks can be added as indicated by numeral 101. Each of the tasks 100, when activated by control 25, scans the queued MWEs 26 for identifying work to be done. Such work may include selecting a migration volume by activating submodule SELMV 103, checking whether a recall needs a tape volume by module CKRNT 104, or releasing a migration volume by module RELMV 105. MCDS 40, including the three records MCV 36, MCD 37, and MCR 38, is accessed by all of the tasks as well as by the three illustrated subtasks. TAL 34 is accessed, as well as other data structures indicated by ellipsis 107 (see documents incorporated by reference) which are not described herein for purposes of brevity. In a similar manner, other subtasks indicated by ellipsis 106 may be employed by a typical storage-management program.

The operation of the FIG. 3 illustrated flow results in a set of priorities in resolving contentions for access to the data storage volumes, as set forth in the table below (VOLSER means a specific data storage volume):

| TABLE OF PRIORITIES REQUEST SWITCH VOLUME | | |
| --- | --- | --- |
| FROM Task | TO Task | Action |
| Migrate | Recall | Yield VOLSER to recall, migrate selects new volume |
| Recall(Other Host) | Recall | Wait for other host to finish, then use VOLSER periodically check MCV 36 |
| Migrate | Recycle (Source) | Migrate keeps VOLSER, recycle selects another source volume |
| Recall | Migrate | Recall keeps VOLSER, migrate selects another volume |
| Recall | Recycle (Source) | Recall keeps VOLSER, recycle selects another source volume |
| Recycle (Source) | Migrate | Recycle keeps VOLSER, migrate selects another volume |
| Recycle (Source or Target) | Recall | Recycle keeps VOLSER, recall aborts |
| Recycle (Source or Target) | Recycle | 1. Omit the current source (already being recycled) 2. Select new recycle target 3. If requested source is current target abort |

The above table summarizes the practice of the invention in the illustrated data processing environment as will be better understood by a continued reading of the specification.

In a storage-management multihost environment, a number of different storage-management tasks can be requesting access to various data storage volumes for performing diverse storage-management functions, resulting in contentions for particular data storage volumes which in turn can result in degraded performance. Within a single host 10, there can be one data storage volume assigned as a target volume for a data set migration by MDSN 28A, a second data storage volume assigned as a target volume for defragmentation, by the recycle module 30 and a third data storage volume assigned as a target volume for volume migration (MGEN 28B migration). Any of these data storage volumes could be needed for recalling a data set to be used by an application program.

In the illustrated embodiment, two different migration tasks can operate in one host at a given time; one migration task MGEN 28B performs so-called volume migration, and the other migration task MDSN 28A performs data set migration. Generally, there is no contention between these two migration tasks and between recycle 30 target volumes. When a recall function is using a selected migration volume at the time it is needed by either of the migration tasks, the migration task defers to the recall for the desired volume and selects a new volume (dynamic reconfiguration) as its target migration volume. In the event that a selected migration volume is currently being recycled (source), or having its data defragmented to another data storage volume, the migration task again defers to the defragmentation and selects a different data storage volume as a target migration volume, i.e., the volume that is to receive data being migrated from L0 DASD 14.

When the recall task of one host needs a data storage volume currently being accessed by a second host using the volume for migration task, the recall task records in MCR 38 that a recall task needs the volume. The requesting recall task then periodically retries the recall request until the desired volume is available or until a preset number of retries fail. Known time out control mechanisms (not shown) reactivate recall 27 to repeat a preset maximum number of retries. The volume using migration task in the second host scans MCR 38 notice the recorded request from the unknown recall task; the using migration task then releases the target migration volume to the requesting recall task 27 at a suitable breakpoint, such as the end of a data set; the remaining portions of the migration task are then performed to a newly-selected target migration volume. This dynamic reconfiguration results in data from one primary volume to be recorded in multiple target migration volumes.

In a single-host environment, there are no contentions between the up-to-fifteen simultaneous recall tasks since the single-host program execution serializes all recalls from a single source volume. In the illustrated embodiment, if the recall task will attempt to access a migration volume currently being defragmented, the recall is aborted. However, a defragmentation, or recycle, can be overridden by a command from the console 20 for holding all defragmentations for ensuring that the defragmentation control does not unduly interfere with host-processor storage management performance. When a defragmentation or recycle request using the recycle module 30 needs a volume currently used by either migration or recall, the recycle task skips over that particular requested volume, causing the recycle request of that volume to fail. Recycle, or defragmentation processing, continues with other volumes needing defragmentation. For any target volumes for defragmentation being used by another task, the recycle module 30 defers to the other task and selects a new target volume for receiving defragmented data.

In a multihost environment, contention resolution is more probable, and intercommunication is more complex. When migration in a given host needs a volume as a target migration volume, contention is resolved by dividing the eligible target volumes into sets for each of the hosts. If such migration volume is in use by a recall task in another host or is being defragmented by another host, another target migration volume is selected. Whenever a host recall task needs a migration volume currently used by another migration task in another host, the recall task enters the appropriate bit in the using hosts MCR 38 for informing the other host that a recall task (in the present embodiment, the recall task is not identified) is waiting for the volume. The migration task in the host having access rights to the volume will release the volume to the recall task and select another target migration volume to continue the migration operation. In this manner, a single set of data sets may be dispersed over a plurality of data storage volumes.

The recall task retry procedure for obtaining a requested migration volume can be limited to a predetermined number or to a predetermined time period. Operator intervention enables the operator to use console 20 for indicating to the requesting host that it can use the volume because of predetermined error conditions. The operator also can give a command to the volume recalling host to wait longer; or the operator can cancel the recall, thereby aborting the application program that needs the data set.

A GO signal received from the console 20 causes the storage-management program to access and modify MCV 36 for indicating that a given data storage volume is in use by setting USE bit 73 and inserting HID of the requesting host in HID 74. While a recall task is waiting for a given data storage volume to be released, the recall task recalls data sets stored in other tape volumes such that the storage-management program provides a maximal amount of service to hosts 10, 11.

When recycle task 30 needs a volume as a source volume for recycle which is currently in use by any other task in another host, recycle task 30 selects another volume and fails the recycling of the initially requested volume. If a selected target volume is in use by a recall task of another host or as a source volume on another defragmentation function in a different host, another target volume is selected for defragmentation. The above description summarizes the functions detailed below.

Figure 4:
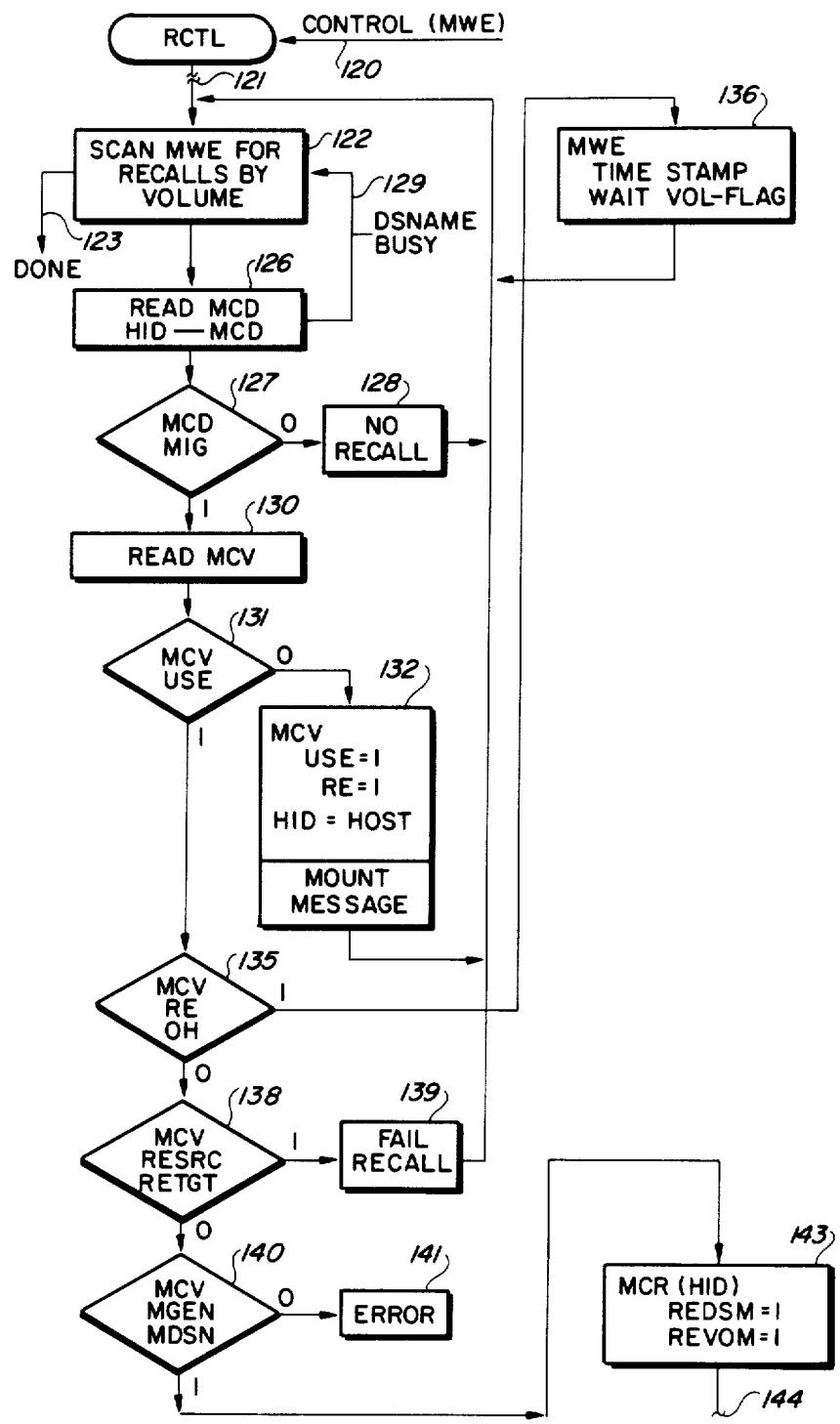
FIG. 4 is a simplified showing of a recall set of machine operations of the FIG. 3 illustrated computer program which illustrates certain aspects of practicing the present invention.

FIG. 4 is a machine-operations chart showing operations of recall task 27. Control module 25 activates recall task 27, as indicated by arrow 120 of FIG. 4. For activating recall task 27, control module 25, through its dispatching function, senses that an MWE 26 has previously been established for a recall function. Then, after recall activation in the recall operation, some nonpertinent machine operations 121 are performed. Then at 122, the recall task scans the queued MWEs 26 for identifying all recalls for each volume having a recall request; in other words, if there are a plurality of recall MWEs associated with a given volume, those recalls are collected such that all recalls from a single data storage volume are made during a single volume selection and mounting on a recorder. When a recall MWE 26 is identified in scan 122, the storage-management program at 126 causes the host in which the program is being executed to read MCD 37 at the entry 50 corresponding to the DSNAME in the identified recall MWE 26. The HID of the reading host 10, 11 is inserted in HID 53 for serializing the program's access to that particular entry; i.e., any host accessing the entry 50 will see that another host has already accessed it and defers to the first accessing host. If HID 53 identifies a host at step 126, the storage-management program enables the executing host to return to the scan 122 as indicated by arrow 129, indicating that DSNAME is busy. Assuming that the data set DSNAME is not being accessed, at 127 the MIG field 54 is accessed to determine whether the data set in fact is currently migrated; if not, no recall is needed as indicated at 128. Scan 122 then continues. This latter action signifies that the requested DSNAME already is stored in the primary data storage area L0 DASD 14. Generally, the requested data sets will be migrated at 127; then at 130, the entry of MCV 36 corresponding to the data storage volume identified in MVSN 58 (FIG. 2, MCD 37) is accessed. At 131, USE bit 73 of the corresponding MCV 36 entry is examined. Assuming that the requested volume is not in use, at 132 the storage-management program enables the executing host for the requested volume to set its USE bit 73 to unity, to set its RE 77 to unity for indicating a recall user, and to identify itself by inserting its identification in HID 74. Depending upon the characteristics of the data storage volume, a mount message may be issued to console 20 for prompting the operator to mount the requested tape reel comprising the requested data storage volume on a suitable tape recorder 17, MSS 16 may automatically mount a data tape cartridge (not shown) on a cartridge player or data may be retrieved via a teleprocessing network (not shown and not discussed in the documents incorporated by reference). Scan 122 then continues for identifying additional work.

If, on the other hand, the requested recall volume is currently in use as indicated by its USE bit 73, the storage-management program at 135 enables the executing host to examine the MCV 36 user field to determine whether the user is another recall, and examines HID 74 to determine whether the user is in another host (OH). If the user is a recall task in another host, at 136 the storage-management program enables the executing host to access the recall requesting MWE 26 just scanned by scan 122, insert a time stamp (not shown) for indicating that an access request for the identified data storage volume occurred; a wait volume flag (not shown) in the recall requesting MWE 26 is also set. This wait volume flag, among other things, prevents demounting or selection of the requested volume until its time delay has expired such that the recall can be executed later without undue delay. Scan 122 then continues.

Assuming that the recall in another host is not the current user of the requested volume, the storage-management program enables the executing host at 138 to examine fields SCYC 78 and TCYC 79 to determine whether a defragmentation function (recycle) currently has access to the requested data storage volume. If defragmentation is in process, the recall fails at 139, which may result in aborting the execution of an application program; in any event, the scan of MWEs 26 continues at 122. Assuming that no defragmentation is occurring at 138, the storage-management program enables the executing host to determine whether a migration task is currently using the requested data storage volume. If not, an error condition has occurred, which is reported at 141 for initiating suitable recovery procedures beyond the scope of the present description. On the other hand, a migration task employing the desired volume results in the storage-management program enabling the executing host at 143 to access the MCR 38 entry corresponding to the using host for either setting REDSM 91 to unity when the using migration task is MDSN, or setting REVOM 92 to unity when the using migrating task is MGEN. Then at 144, the executing host proceeds to other functions associated with recall not pertinent to an understanding of the present invention. The documents incorporated by reference describe such additional or nonpertinent functions. Upon completion of the recall task, the storage-management program returns the executing host to the control module 25 and thence to other programs being executed.

Figure 5:
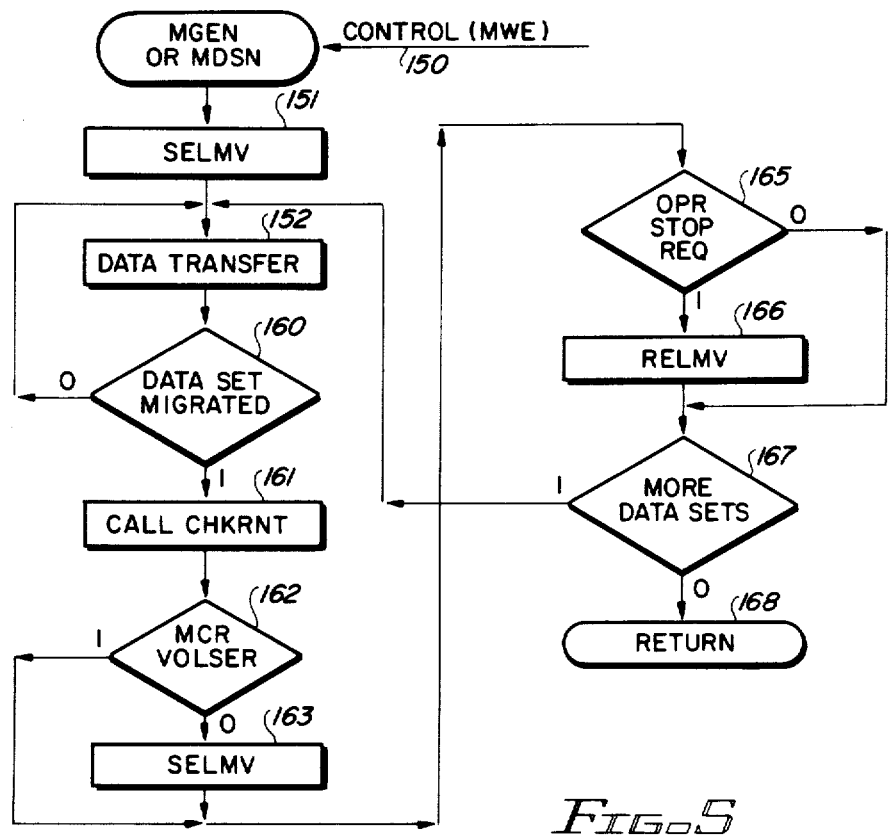
FIG. 5 shows a simplified migration control program portion of the FIG. 3 illustrated computer program illustrating certain migration control aspects of the present invention.

FIG. 5 illustrates that portion of the migration modules MGEN and MDSN pertinent to an understanding of the present invention. The single drawing represents both modules insofar as practicing the present invention is concerned. Either module is invoked from control module 25, as indicated by single-headed arrow 150 via an MWE 26. First, a data storage volume is selected at 151 by activating program module SELMV of FIG. 7. Upon successfully selecting a migration (secondary volume) data storage volume, data transfer of one data set is accomplished at steps 152 and 160. At 160, the storage-management program enables the executing host to determine whether the data set identified by DSNAME 52 has been in fact migrated. Field MIG 54 is examined. If the data set is not migrated, data transfer at 152 continues. Upon completion of data set transfer, subroutine, or submodule, CKRNT 161 (FIG. 6) is called and executed as later described for checking the recall task need for the current target migration volume. At 162, the storage-management program enables the executing host to examine DMVL 93 (for MDSN) or VMVL 94 (for MGEN) for the current migration task. If the examined VOLSER is zero, the subroutine, or submodule, SELMV 103 is activated to select another data storage volume for the migration task, as detailed with respect to FIG. 7. Otherwise, no data storage volume need be selected as the initially selected data storage volume can still receive subsequently migrated data sets. At 165, the storage-management program enables the executing host to examine the current console 20 indicated status (did operator enter the HOLD command to stop activity?) to determine whether to continue processing the data storage management functions; a "no more" work indication is provided, or the storage-management program execution is to stop. If any of these conditions are detected, at 166 (as detailed in FIG. 8) all of the migration volumes assigned to the current migration task are released by RELMV 105. Then at 167, the storage-management program enables the executing host to proceed to other machine activity via control module 25.

Figure 6:
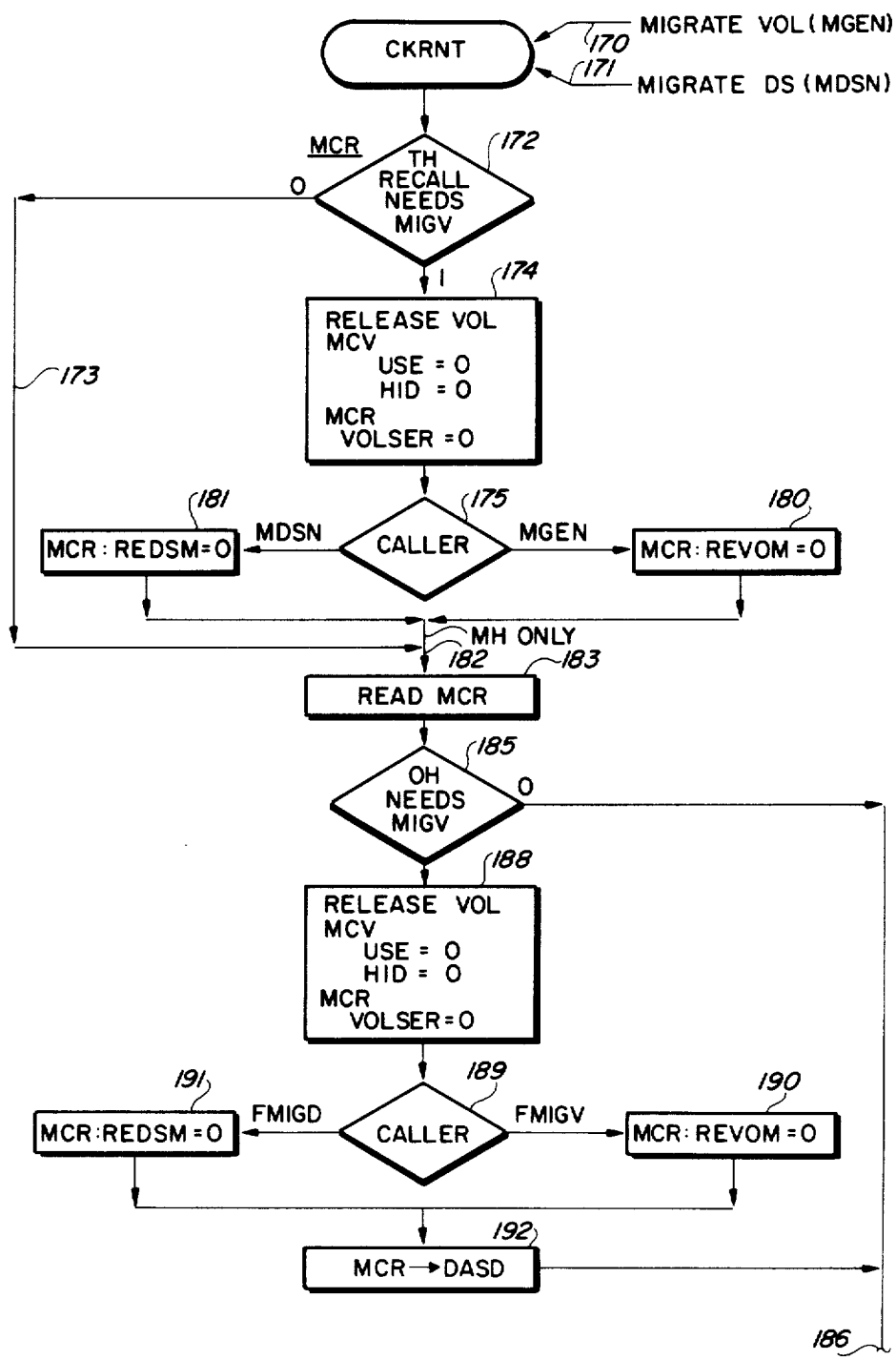
FIG. 6 is a flow chart illustrating certain checking and management functions performed in connection with the FIG. 5 illustrated flow diagram.

FIG. 6 illustrates the submodule CKRNT 104 which checks the recall status for a tape volume or other data storage volumes associated with migration of data sets or data volumes. Submodule CKRNT 104 is activated as indicated in FIG. 3 from either module 28A or 28B, respectively indicated in FIG. 6 by arrows 170 and 171. At 172, the storage-management program enables the executing host to examine the executing host MCR 38 entry to determine whether any executing host has a recall request which needs a migration volume (MIGV) assigned to one of this executing host's current migrations. If not, logic path 173 leads the executing host to program logic juncture 182, later described. If a recall task has been delayed because of the need for migration volume, the storage-management program enables the executing host to proceed to step 174 for releasing the migration data storage volume from this host's current migration task for enabling reassignment of the migration data storage volume to the requesting recall task of another host at its next recall retry. It will be remembered that, in FIG. 4, the scan of MWEs 26 at 122 results in examining the various MCV 36 entries for determining usage of the volumes needed for the recall request. In any event, at 174 the MCV 36 entry for the volume identified in the MWE 26 for the current migration task has its corresponding entry accessed. This access can be from main memory of the executing host or, in a rare event, can be transferred from common DASD 12 into the main memory (not shown) of the executing host. The USE bit 73 and the HID field 74 of the appropriate MCV 36 entry are both set to zero for releasing the migration data storage volume from the current migration task. The MCR 38 is then accessed for resetting the VOLSER in either DMVL 93 (MDSN) or VMVL 94 (MGEN) to zero for indicating to the migration task of the migration-task executing host that a different target migration volume must be selected. At 175, the storage-management program enables the executing host to access the appropriate bit REDSM 91 in step 181 or REVOM 92 in step 180 of the appropriate MCR 38 entry for the current executing host in main memory (not shown) for resetting same to zero. From step 180 or 181 the executing host proceeds to juncture 182. At this juncture, the executing host determines whether it is operating in a multihost or single host environment. If it is operating in a single-host environment, steps 183–192 are dispensed with, allowing the host to proceed directly to additional steps 186, not described as not being pertinent to an understanding of the present invention. Such additional steps can be ascertained from examination of the documents incorporated by reference.

In the multihost environment, a copy of the MCR 38 entry for the executing host is obtained from common DASD 12 at step 183. The HID required to identify the appropriate MCR 38 entry is obtained from the executing hosts MCR 38 entry HID 89 which identifies the other or recall requesting host. This copy of MCR 38 is the one accessible by other hosts for setting bits 91 or 92 to inform the executing host that a recall request needs the executing host's current target migration volume. At 185, the storage-management program enables the executing host to examine bits REDSM 91 and REVOM 92 of the MCR 38 entry for the executing host. If either of these bits is unity, another host (OH) needs a migration volume from the executing host for purposes of satisfying a recall MWE 26. If both the bits REDSM 91 and REVOM 92 are zero, no recall request in any host in the data processing environment needs the current migration target data storage volume. The indication of no recall need allows the executing host to proceed to additional steps 186. Otherwise, at 188 the migration data storage volume involved with the migration task, depending upon the caller (data set or volume migration task), is released. For example, when MDSN activates CKRNT, only bit REDSM 91 is examined; for a volume migration, only bit REVOM 92 is examined.

The corresponding volume assigned to the migration task is released at 188 for allowing a recall retry to succeed. The MCV 36 entry for the appropriate VOLSER being released is accessed for resetting USE bit 73 to zero and resetting field HID 74 to zero. The VOLSER (stored in DMVL 93 for MDSN or VMVL 94 for MGEN) in MCR 38 for the current migration task is accessed, for erasing its MCR 38 stored VOLSER for enabling SELMV 103 to select another volume for the current migration task. At 189, the caller is determined to be either the data set or the volume migration task. Then at steps 190, 191 respectively, either bit REVOM 92 or REDSM 91 is reset to zero. At 192, a copy of the MCR 38 entry for the executing host, as updated in steps 190 and 191, is stored in common DASD 12. Additional nonpertinent steps 186 are then executed.

Figure 7:
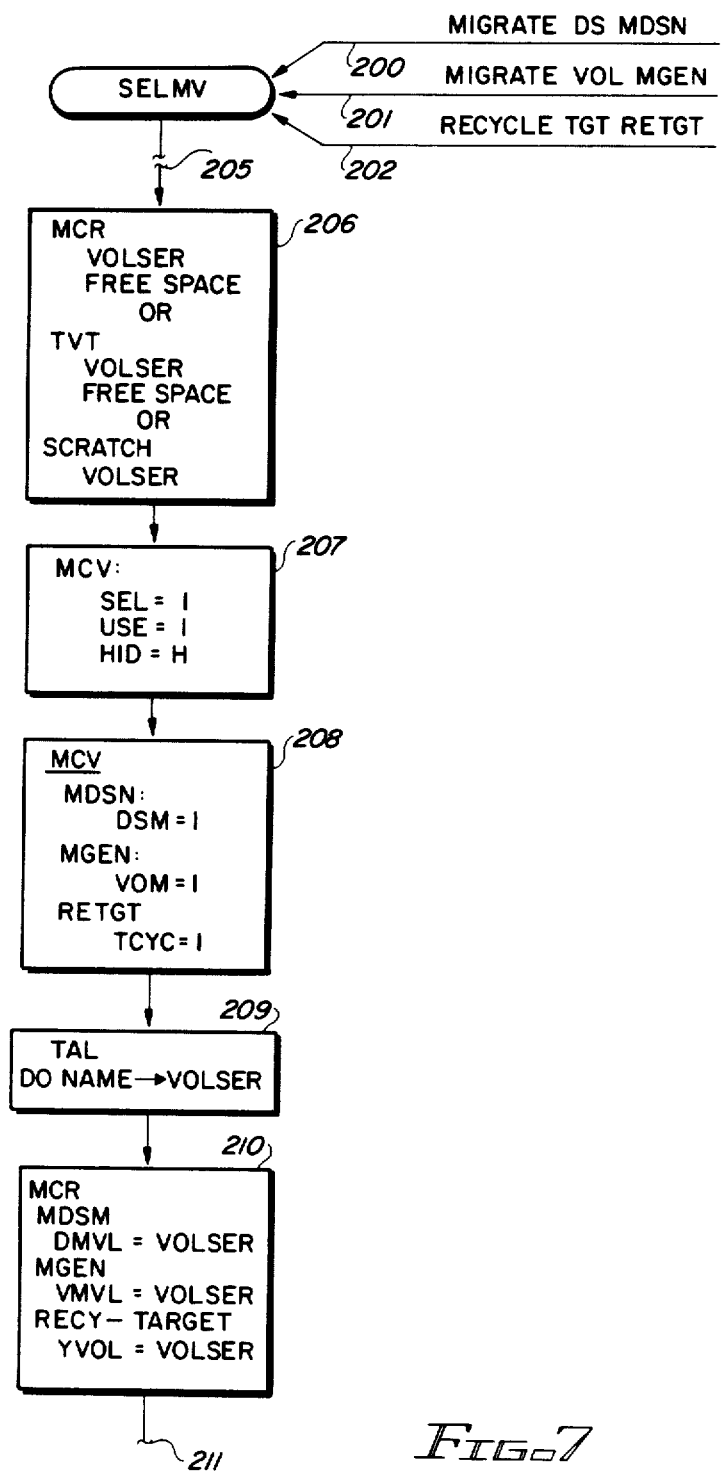
FIG. 7 illustrates a set of machine operations for selecting a migration volume in accordance with the execution of the FIG. 3 illustrated program.

Referring next to FIG. 7, SELMV 103 is described. This submodule can be activated from any one of three tasks: the migrate data set task, as indicated by arrow 200; the migrate volume task, as indicated by arrow 201; or the recycle task, as indicated by arrow 202. At 205, some nonpertinent machine operations are performed. At 206, MCR 38 is accessed for determining whether or not the VOLSER identified data storage volume last used by the requesting task. The respective MCR 38 field DMVL 93, VMVL 94 and YVOL 95 (see FIG. 2) is examined for the last used VOLSER. When that VOLSER is not found in MCR 38, it is no longer available; volume selection continues at step 207. If the requested VOLSER is found in MCR 38, then MCV 36 is accessed for determining whether or not it has sufficient free space; i.e. not full. If the VOLSER is not full and not in use by another task, then the USE bit 73 is set to unity and the requesting task uses this volume. When the last-used VOLSER is full or in use, another data storage volume is to be identified which is currently available for use by the requesting task. Firstly, TVT 43 is accessed for finding any data storage volume having sufficient free space suitable for receiving migration or defragmentation data. When these criteria are met, the corresponding VOLSER is stored in MCR 38 in the appropriate field DMVL 93, VMVL 94 or YVOL 95 of the appropriate MCR 38 entry to identify its use as a migration or defragmentation target data storage volume. Identifying in TVT 43 a data storage volume which is a tape reel requires mounting the tape reel on a tape player or recorder by the operator. If neither of the above mentioned lists of data storage volumes identifies a data storage volume having sufficient free space for the intended purposes as determined by parameters beyond the scope of the present description, a scratch volume (no data stored on the volume) is identified from the scratch list 42 in common DASD 12. The scratch volume's VOLSER is then stored in MCR 38 (field DMVL 93 for MDSN, VMVL 94 for MGEN or YVOL 95 for RETGT) of the appropriate MCR 38 entry and is deleted from scratch list 42. A suitable mount message is supplied to console 20 identifying an appropriate tape recorder (not shown) such that the operator is prompted to mount the desired data storage volume on the appropriate tape recorder. Such mount message also may be supplied to MSS 16, which is interpreted by the MSS 16 for automatic mounting on a tape recorder of one of its data storage volumes.

Once a VOLSER has been identified, the executing host accesses MCV 36, which may require the generation of a new entry or the modification of an existing entry. The VOLSER representing entry in VSN 71 is identified and fetched from common DASD 12. Its fields SEL 81, USE 73 are set to unity, while the host ID of the executing host is inserted in field HID 74. At 208, the storage-management program enables the executing host to indicate in the users' field which task has selected the volume: for data set migration, DSM 75 is set to unity; for MGEN caller, the bit VOM 76 is set to unity; whereas for a target recycle, TCYC 79 is set to unity. It should be noted that the source data storage volume to be recycled is identified in the MWE 26 associated with the recycle task, with the SCYC 78 bit set to unity by control module 25 establishing the MWE 26 for the defragmentation or recycling task assignment. Then at 209, the executing host accesses TAL 34 and assigns the DDNAME of the allocation of a target data storage volume to the VOLSER identified at step 206. The tape-allocation list (TAL) 34 is used during migration of data sets to tape volume and recycling data to a tape volume. The TAL consists of a DDNAME (not data set name) and up to 255 volume serial numbers. DDNAME represents the allocation of the tape drive. When migrating to a tape volume or recycling to a tape volume and the end-of-tape marker is reached, another tape volume is mounted for continuing the migration or recycle. As each subsequent tape volume is mounted, its volume serial number is added to TAL 34. Then additional steps 210 are performed. It should be noted that, in reassigning VOLSERs from migration volumes, the release of the migration volume requires the executing host to delete the DDNAME having assignment of those VOLSERs representing data storage volumes that have received a migrated data set and are already a recycle source data storage volume.

Figure 8:
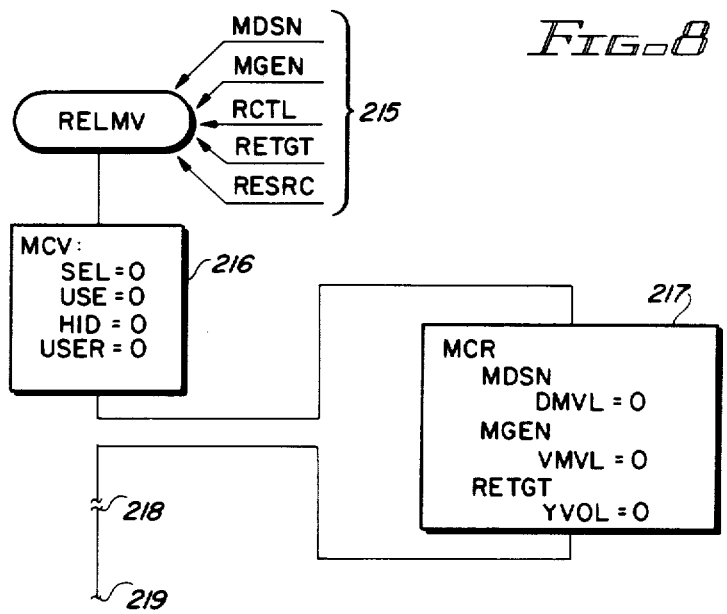
FIG. 8 is a simplified diagram showing release of a migration volume using the FIG. 3 illustrated program.

FIG. 8 illustrates RELMV 105. Numeral 215 indicates that any of the storage-management tasks 100 can activate RELMV 105 for releasing a migration volume from the respective calling task. Such releases include releasing source defragmentation volumes, target defragmentation volumes, recall source volumes, and migration target volumes. At 216, the storage-management program enables the executing host to access the appropriate record entries of MCV 36 for resetting the SEL 81 and USE 73 bits, the user field to zero, and the HID 74 field to zero. At 217, the release of the identified data storage volume is reflected into MCR 38. When the caller is MDSN 28A, the VOLSER stored in DMVL 93 is erased (DMVL=0), when the caller is MGEN 28B, the VOLSER stored in VMVL 94 is erased (VMVL=0) or when the caller is either RETGT or RESRC the VOLSER stored in YVOL 95 is erased (YVOL-0). At 218, some additional steps are performed by the executing host; the return to control module 25 is indicated by numeral 219.

Figure 9:
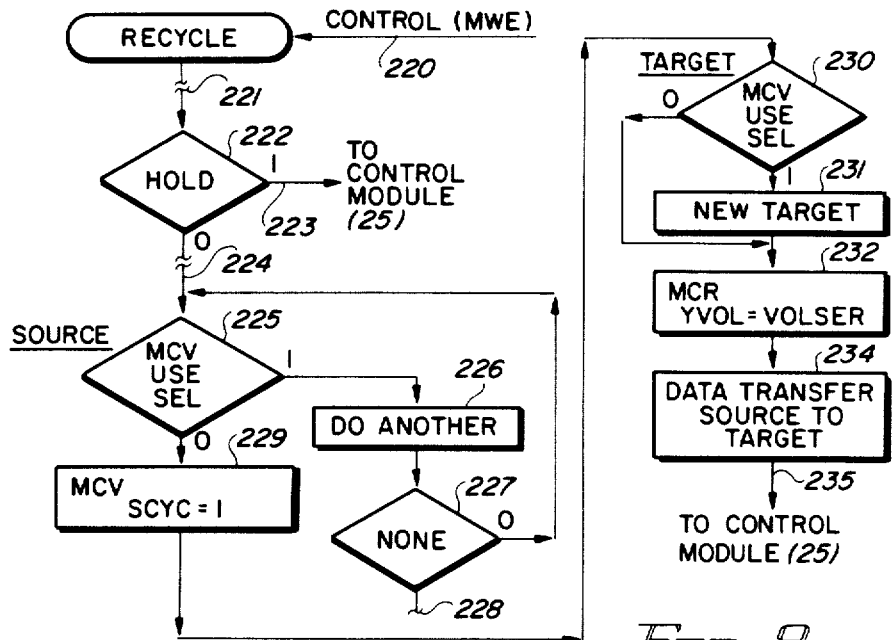
FIG. 9 is a simplified flow diagram of a recycle portion of the FIG. 3 illustrated program which enables defragmentation of data stored in a large diversity of peripheral data storage devices.

FIG. 9 illustrates, in simplified form, the machine operations associated with a recycle task. The recycle task is initiated when a recycle MWE 26 is set up by control module 25, as explained earlier. Arrow 220 shows the invocation of the recycle task. Nonpertinent steps are first performed at 221. At 222, whether a HOLD (recycle) command has been received from the console 20 is determined. CP 29 responds to such a supplied command to set a flag (not shown) within control module 25 which indicates that recycling should not be started. If held, the recycling task is bypassed, as indicated at 223, as a return to control module 25. Otherwise, at 224 MWEs 26 in the previously mentioned FIFO queue (not shown) are scanned for recycling work elements in a manner similar to scanning for the recall work elements. Upon identification of an appropriate recycling task, the executing host moves to step 225 for identifying the source data storage volume which is storing the fragmented data. The MCV 36 entry corresponding to the VOLSER identified in the MWE 26 is examined in the USE field 73 and the SEL field 81. If the source volume is busy, another source volume is selected. At 226, the scan of MWEs 26 continues. If a MWE 26 is found, step 225 is repeated; if the MWE 26 scan completes, at 227 the executing host leaves the recycling task to return to the control task 25, as indicated at numeral 228. If another MWE 26 is identified, then from step 227 the executing host repeats step 225. When a source volume is identified that is not busy (its USE bit 73=0), at 229 MCV 36 is accessed for setting SCYC 78 to unity. Then at 230 the target volume identified in the MCR 38 is examined. If the target volume MCV 36 fields USE 73 or SEL 81 are set to unity, a new target volume is selected at 231. Otherwise, step 231 is omitted. At 232, the executing host accesses its MCR 38 entry for storing the VOLSER of the selected target data storage volume in YVOL 95 (YVOL=VOLSER). The recycling or defragmentation data transfers are performed at 234 by transferring data signals from the identified recycle source data storage volume to the identified recycle target data storage volume. This transfer uses normal data processing techniques for defragmentation and are not described for that reason. After completing the recycling data transfer, the executing host will either return to control module 25 (recycling of VOLSERs listed in the MWE 26 has been completed) or will obtain the next VOLSER from the MWE 26 and repeat the functions described for FIG. 9.

It should be remembered that the above description of FIGS. 3-9 are made for a single host; it is to be understood that various ones of the tasks as well as the same type of task are usually simultaneously being executed in the various hosts of a multihost data processing environment. Each of the individual hosts may have two migration tasks, fifteen recall tasks and a recycle task active at any given instant. In a ten host system environment, this means up to twenty migration tasks, 150 recall tasks and ten recycle tasks active at one time for managing the diverse peripheral data storage volumes. From these figures, it should be apparent that the facile contention resolution and attendant storage-management functions of the present invention can be advantageously employed.

In summary, the various contention resolutions between accesses to the lower level volumes of the data storage hierarchy can be summarized as follows for the illustrated embodiment, no limitation thereto intended. Any request for access to a given lower level (also termed migration volume) data storage volume for the purposes of transferring data from a primary volume to the given migration volume results in the request obtaining another migration volume when either a recall or recycle task is using the given volume. This action allows the presently using tasks to efficiently complete their jobs while the short delay in the migration request caused by selecting another volume does not substantially impact overall system performance. In the illustrated embodiment, each host of a multihost environment has its own exclusive set of migration target volumes which eliminates contention between two migration tasks in different host for migration target data storage volumes.

The recall requests having a contention for a migration volume is handled differently. For contention with a recall currently using a given data storage volume being requested, the recall task requesting the given data storage volume waits (the waiting task retries accessing the busy data storage volume during the waiting period. Of course, other unrelated tasks are performed by the executing host during the waiting period) until the using recall task completes its recall and then proceeds. When the task using the given volume is a migration task, the recall requesting the given volume waits (performing access retries) until the migration task releases the given volume. Release occurs at the first breakpoint in the migration, such as when transfer of a data set is completed. Then the requesting recall task obtains access to the given volume while the using migration task selects another volume to complete its migration work. In the event the task using the given volume being requested by a recall task is being used by the recycle task, the recall of the given data set is failed.

Each recycle request for using a requested data storage volume as either a source or target of the recycle operation results in the recycle task selecting a new source or target data storage volume whenever requested data storage volume is busy with any task. When the requested data storage volume is to be the recycle source volume, then the recycle task always defers to the using task and goes to another volume to recycle its stored data.

While the invention has been particularly shown and described with reference to preferred embodiments thereof, it will be understood by those skilled in the art that various changes in form and details may be made therein without departing from the spirit and scope of the invention.

What is claimed is:

1. In a method of resolving contentions for any one of a plurality of data storage volumes during predetermined data transfer operations related to operations of a digital computer connected to said plurality of the data storage volumes;

the machine-implemented steps of:
designating a first one of said data storage volumes for receiving first data from a second one of said data storage volumes, determining that said first data storage volume is currently being accessed, yielding said first data storage volume to any current user thereof, and then designating a third data storage volume to receive said first data, beginning to transfer said first data from said second volume to said third volume; and designating said third data storage volume as a source of second data to be transferred to a fourth data storage volume, determining that said third data storage volume is currently receiving said first data from said second data storage volume, then designating said third data storage volume for supplying said second data, stopping said transfer of said first data from said second volume to said third volume and transferring said second data to said fourth data storage volume, and then designating a fifth volume to receive any remaining portions of said first data not yet transferred to said third data storage volume and transferring said any remaining portion of said first data to said fifth data storage volume.

2. In the method set forth in claim 1, further including the steps of:
- designating any one of a plurlaity of sixth ones of said plurality of data storage volumes as a source of data to be transferred to any one of a plurality of seventh ones of said plurality of data storage volumes, respectively;
- examining whether said any one of said plurality of sixth ones of said plurality of data storage volumes are the same data storage volumes as said first, third, or fifth data storage volumes, when identity between said one of said sixth storage volumes and said first, third or fifth data storage volumes is determined, aborting said attempted data transfer from the identical said one of the sixth storage volumes of said plurality of data storage volumes to the one of said seventh data storage volumes; and
- examining whether any of said ones of said plurality of seventh ones of said plurality of said data storage volumes are the same data storage volume as said first, third or fifth data storage volumes, when any one of said seventh ones of said plurality of data storage volumes are the same as said first, third or fifth data storage volumes, selecting an eighth one of said data storage volumes to receive data from a respective one of said sixth ones of said plurality of data storage volumes; otherwise transferring data from said one of said sixth storage volumes to one of said seventh storage volumes.

3. In the method set forth in claim 2, performing the method steps recited in claim 11 on said second and fourth ones of said plurality of data storage volumes which comprise disk data storage apparatus and on said first, third, fifth, sixth, seventh and eighth ones of said data storage volumes which comprise either reels of data storage tapes mountable of tape recorders or disk data storage apparatus; and
- mounting predetermined ones of said reels of data storage tapes on tape recorders connected to said digital computer as said first, third, fifth, sixth, seventh or eighth ones of said plurality of data storage volumes.

4. The method of promoting and demoting data between data storage levels of a data storage hierarchy having a first plurality of addressable data storage devices in a primary level of the data storage hierarchy and a second plurality of addressable data storage devices in a secondary level of the data storage hierarchy, each of said devices having an addressable data storage volume for addressably storing a plurality of data items; including the machine-executed steps of:
- designating a first one of said data storage volumes on a device in said secondary level of said data storage hierarchy to receive first data from a second one of said data storage volumes on a device in said primary level of said data storage hierarchy;
- determining that said first data storage volume is currently a source of second data being supplied to a third data storage volume on one of said devices; and
- continuing to designate said first data storage volume to be the source of said second data, designating a fourth data storage volume to receive said first data, and transferring said first data to said fourth data storage volume.

5. In the method set forth in claim 4, further including the steps of:
- while transferring said first data from said second data storage volume to said fourth data storage volume, requesting to fetch data from said fourth data storage volume;
- setting a flag signifying receipt of said request to fetch data from said fourth data storage volume;
- continuing to transfer said first data to said fourth data storage volume;
- segmenting said transfer of first data into predetermined data sets;
- upon completing a transfer of each of said data sets of said first data, sensing said flag to ascertain a need for said fourth data storage volume to supply data, upon sensing said flag as signifying said receipt, freeing said fourth data storage volume for use by said fetch request; and
- selecting a fifth data storage volume to receive any data sets of said first data not yet transferred from said second data storage volume.

6. In the method set forth in claim 5, further including the steps of:
- transferring third data from a sixth data storage volume to a seventh data storage volume, checking whether either said sixth or seventh data storage volume is currently being accessed for a data transfer other than for said third data, if said sixth data storage volume is currently being accessed, abort the transfer of said third data, if said seventh data storage volume is currently being accessed, selecting an eighth one of said data storage volumes and transferring said third data to said eighth data storage volume, otherwise transferring said third data to said seventh data storage volume.

7. In the method set forth in claim 6, further including the steps of:
- while transferring said third data from said sixth data storage volume receiving a request for transfer of data from said sixth data storage volume, denying said request for transfer of data;
- while transferring said third data to either said seventh or said eighth data storage volumes as a receiving data storage volume, receiving a request for transfer of data from said receiving data storage volume, and denying said received request.

8. The method of operating a programmable digital computer connected to a hierarchy of addressable external data storage devices wherein data from an upper level of said hierarchy are moved to lower levels of said hierarchy in accordance with predetermined criteria, and wherein data stored in the lower levels of the hierarchy are movable back to the upper level in accordance with recall requests, and wherein data are movable between various ones of said external data storage devices for aiding data storage space utilization;
including the machine-executed steps of:
- demoting first data from devices in said upper level to devices in said lower level;
- while demoting said first data, promoting second data from said lower level to said upper level;
- while promoting and demoting said first and second data, moving third data from a first device in one of said levels to a second device in one of said levels for defragmenting storage of said third data; and
- requesting to move fourth data between two predetermined ones of said devices; comparing the request with said promoting, demoting, and defragmenting operations to determine contention for a given one of said two predetermined devices; if either of said two predetermined devices is either said first or second device, then continuing said defragmenting and indicating that said request is currently nonexecutable; if either of said two predetermined devices is a device sourcing said second data for promoting, delaying execution of said request until completion of promotion of said second data; and if either of said two predetermined devices is the target device for receiving said first data, reassigning said target device to said request and assigning another device as said target device to receive that portion of said first data not yet demoted to first-mentioned target device.

* * * * *